Feb. 2, 1926.
E. L. PETERSON
CONCRETE PIPE JOINT
Filed August 13, 1920
1,571,870
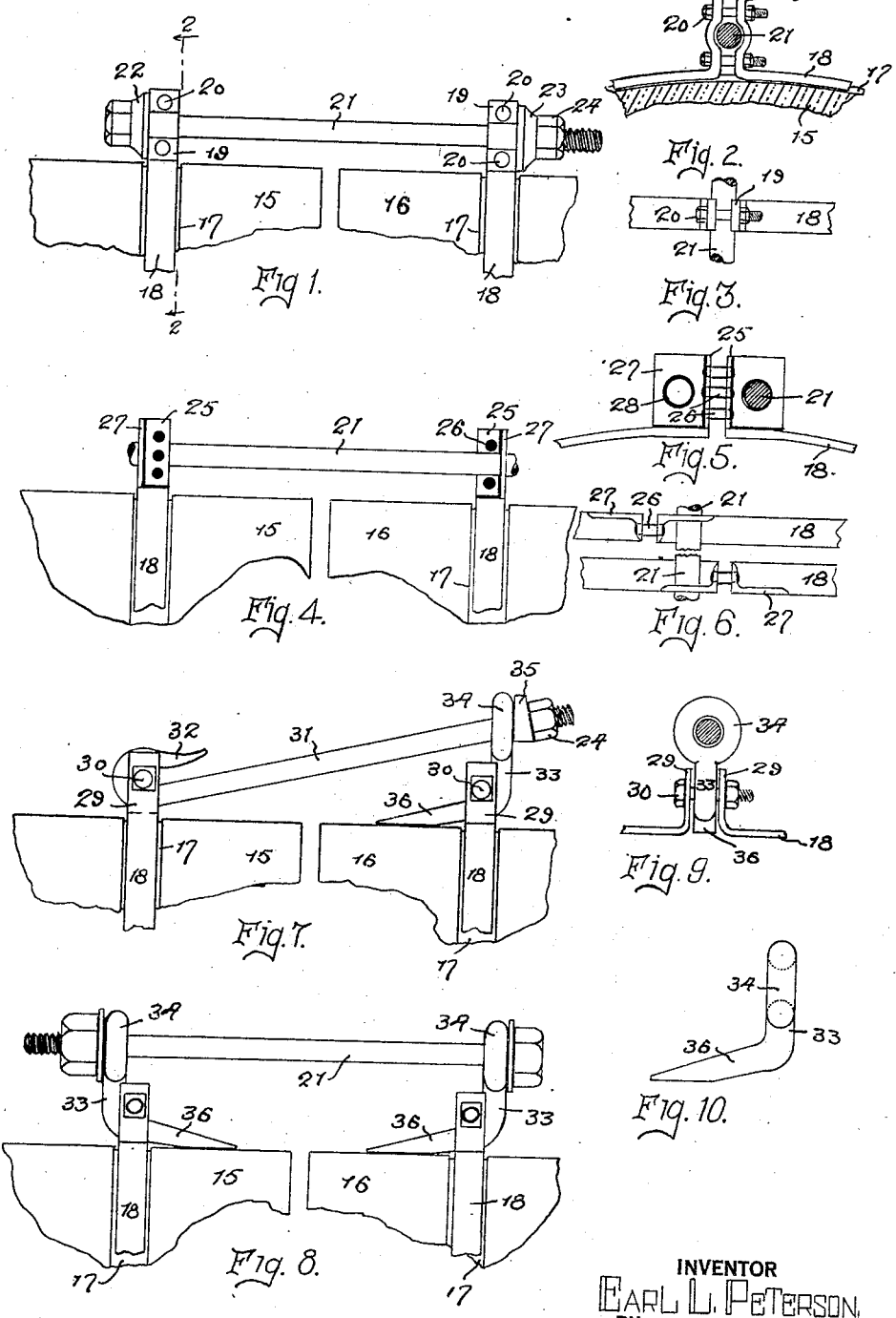
INVENTOR
EARL L. PETERSON,
BY
ATTORNEYS Patented Feb. 2, 1926.

1,571,870

UNITED STATES PATENT OFFICE.

EARL L. PETERSON, OF CORONA, NEW YORK, ASSIGNOR TO UNITED CONCRETE PIPE COMPANY, OF NEW YORK, N. Y., A CORPORATION OF DELAWARE.

CONCRETE PIPE JOINT.

Application filed August 13, 1920. Serial No. 403,206.

*To all whom it may concern:*

Be it known that I, EARL L. PETERSON, a citizen of the United States of America, residing at Corona, in the county of Queens, Long Island, and State of New York, have invented certain new and useful Improvements in Concrete Pipe Joints, of which the following is a specification.

My invention relates to pipe joints, and particularly to joints of the draw-up type. Among the objects of my invention may be particularly mentioned—

1. Relatively adjustable abutment members to facilitate the alinement thereof for engagement by the draw-up element of the joint;

2. Means for holding the adjustable members in position after they have been placed in proper relation for engagement by the draw-up member;

3. Abutment carrying bands on the abutting pipe ends, one or both of the bands being rotatable on the pipe after the latter has been positioned;

4. Wedge means for holding the adjustable band in its adjusted position;

5. Combination wedge and abutment member detachably engageable with the holding band;

6. Various features of construction and operation hereinafter described or shown in the accompanying drawings, in which—

Fig. 1 is a side elevation of portion of abutting pipes at their joint, together with draw-up means in which my invention is embodied in one form;

Fig. 2 is a broken section on the line 2—2, Fig. 1;

Fig. 3 is a plan of portion of the holding ring and abutment end thereof;

Fig. 4 is a side elevation corresponding to Fig. 1, but showing a modified construction;

Fig. 5 is a front elevation of portion of one of the holding bands at the abutment area;

Fig. 6 is a top plan of the holding bands for the abutting pipe ends, the latter being omitted;

Fig. 7 is a broken side elevation of the abutting pipe ends showing a draw-up device of further modified construction;

Fig. 8 is a similar view of a further modification;

Fig. 9 is a face view of portion of one of the bands at the abutment end thereof; and Fig. 10 is a side elevation of one of the wedging abutments for the draw-up member.

In handling concrete pipe it is customary to carry the pipe length in a crane and lower it thereby to a position either in alinement with the pipe already laid, or to deposit it from the crane upon a cradle upon which it is transported into position to make joint with the line. Where the pipe is of large diameter it often happens that it is picked up by the crane or is deposited upon the cradle without particular care as to the joint-making elements at the pipe end. Where the pipe sections are united by draw-up bolts, it is necessary to bring the abutment elements for the bolts into proper alinement for engagement thereby. This necessitates the manipulation of the pipe either while in the crane or while in situ, and involves a considerable delay and inconvenience. Such delays and inconveniences incident to manipulation of the pipe are particularly objectionable in a submerged aqueous line where the adjustment must be done by divers. The present invention overcomes these difficulties by providing one or both of the pipe ends with bolt abutment means which may be readily adjusted to various angular positions on the pipe without manipulating the pipe as a whole.

Referring to Figs. 1, 2 and 3, I have here shown portion of the abutting ends of two pipes 15 and 16, the joint bearing surfaces being omitted since they form no portion of the present invention. Spaced slightly from the end of each pipe is an annular recess or channel 17 adapted to receive holding rings 18. The latter may be of any desired construction, and may be in more than one piece. I have indicated them in these figures as split rings having their ends offset at 19 to form abutment flanges, pierced to receive tie bolts 20. These rings may be loosely positioned in the channels 17 by partially tightening the tie bolts 20. After the pipes 15 and 16 have been brought into alinement the holding rings 18 may be rotated in the channels 17 until the abutment flanges 19 of the rings are in alinement. In this position the tie bolts 20 may be tightened to hold the rings 18 tight and hold them in position. Before tightening up the tie bolts 20, however, it is advisable to insert between the flanges 19 the heavy draw-up bolt 21 which bears against the flanges through interposed washers 22 and 23. Upon tightening the nut 24 on the draw-up bolt the pipe ends are pulled together by reason of the engagement of the holding rings 18 in the channel 17. It will be understood that I prefer to form each of the holding rings 18 from a pair of straps so that there will be abutment flanges 19 at diametrically opposite points on the pipe. More sections than this may be provided, however, if desired. It will be readily understood, further, that the rings 18 at the end of one pipe may be clamped rigidly in position, and all of the adjustments made by rotating the ring on the end of the abutting pipe.

In the modification shown in Figs. 4, 5 and 6, the construction is in the main the same, with the difference, however, that the holding rings 18 are provided with angle straps, the terminal flanges 25 of which are pierced to receive rivets 26, while the marginal flanges 27 are pierced at 28 to accommodate the draw-up bolt 21. In a construction of this type, the holding rings 18 are clamped in fixed position in the channel 17 when the rivets 23 are inserted. The flanges 27 may be made of any suitable extent and provided with any appropriate number of apertures 28, so that when the pipe ends are brought together the apertures 28 in the flanges on the abutting pipe ends will register, or only a slight adjustment will be required to bring them into register. Thus, in Fig. 6, the aperture in the angle at the left-hand end of the strap 18 registers with the aperture in the flange at the right-hand end of the strap 18 on the other pipe end. Obviously, if the flanges are brought into exact register two parallel draw-up bolts 21 could be inserted through the flanges 27 at the opposite pipe ends. If relative adjustability on the pipe ends is desired, the rivets 26 may obviously be replaced by tie bolts 20, such as shown in Figs. 1 to 3.

In Fig. 7 a further modification is shown in which the straps 18 have their offset flanges 29 pierced to receive a single tie bolt 30 spaced a suitable distance from the surface of the pipe. The draw-up bolt 31 here comprises at one end a hook or eye 32, which engages the tie bolt 30. Co-operating with the opposite end of the draw-up bolt and forming a detachable extension of the abutment flanges 29 is a wedge member 33 having an eye 34, through which the bolt passes, and against which the nut 24 bears through a wedge shaped washer 35. The wedge end 36 of the member 33 may be freely passed between the flanges 29 on the one hand, and between the tie bolt 30 and the surface of the pipe 16 on the other hand. When the nut 32 is tightened on the draw-up bolt 31 the pressure exerted against the eye 34 of the wedge member draws the holding ring 18 tight in its channel 17, thus securing the parts in adjusted position, while the freedom of the band permits the latter to be turned around on the pipe until the abutment flanges 29 thereof are brought into alinement with those of the band 18 on the end of pipe 15. The mere tightening of the nut 24 on the draw-up bolt thus has the effect of securing the holding band 18 in the channel 17 on the pipe 16, at the same time drawing together the pipe ends to close the joint between the same.

In the construction just described the holding band 18 on the end of pipe 15 may be rigidly secured in position and the relative adjustment of the band effected solely by the manipulation of the band on the end of pipe 16. In Fig. 8 both bands are free for angular adjustment, and two wedge members 33 are employed, one for each band. A standard draw-up bolt 21 may therefore be used in this construction.

Various other modifications will readily occur to those dealing with the problem, which do not depart from what I claim as my invention.

I claim—

1. In a concrete pipe joint, an abutment member loose on a pipe end and having an opening to receive a draw-up element, together with draw-up means comprising a draw-up bolt and an associated wedging member adapted to receive the draw-up bolt and having a portion adapted to pass through the opening in the abutment on the pipe end, for the purpose described.

2. In a pipe joint, abutment rings loose on adjacent pipe ends, each ring having an opening to receive a draw-up element, in combination with a draw-up element comprising a bolt and nut, a detachable member adapted to be engaged by the nut, said detachable member comprising a foot piece adapted to engage an opening in one of the rings, and a head adapted to accommodate the shank of the bolt and to afford a bearing for the nut.

3. In a pipe joint, an abutment loose on a pipe end and having an opening to receive a draw-up element, together with draw-up means comprising a draw-up bolt hooked at one end to afford means for engaging an abutment on an adjacent pipe end, together with an associated member having a foot shaped to engage said loose abutment, and a head shaped to afford a way for the bolt and a thrust bearing for a nut secured on the bolt.

In testimony whereof I have signed my name to this specification.

EARL L. PETERSON.